(12) United States Patent
Adair et al.

(10) Patent No.: US 7,159,949 B1
(45) Date of Patent: Jan. 9, 2007

(54) DUMP DOOR OPEN/CLOSE SYSTEM

(75) Inventors: Jim E. Adair, Huntsville, AL (US);
Steve L. Hanvey, Huntsville, AL (US)

(73) Assignee: Schwarze Industries, Inc., Huntsville, AL (US)

( * ) Notice: Subject to any disclaimer, the term of this patent is extended or adjusted under 35 U.S.C. 154(b) by 351 days.

(21) Appl. No.: 10/832,261

(22) Filed: Apr. 27, 2004

Related U.S. Application Data

(60) Provisional application No. 60/466,044, filed on Apr. 29, 2003.

(51) Int. Cl.
*B60P 1/00* (2006.01)

(52) U.S. Cl. ...................... 298/27; 298/35 M
(58) Field of Classification Search ............ 298/25–27, 298/29, 35 M; 105/247; 15/340.1; 220/211, 220/212.5, 810; 49/139, 140, 356
See application file for complete search history.

(56) References Cited

U.S. PATENT DOCUMENTS 3,186,015 A * 6/1965 Beyerstedt
3,910,635 A * 10/1975 Holland .................... 298/35 M

* cited by examiner

*Primary Examiner*—Stephen Gordon
(74) *Attorney, Agent, or Firm*—Wallace G. Walter

(57) ABSTRACT

A debris container of the type used on roadway and pavement sweeper and sweeping vehicles includes a hinged door through which the interior of the debris container may be inspected and through which debris is emptied when the container is elevated and rotated to its dump position. A powered actuator, which may be an electrically powered screw-rod assembly, is connected by mounting brackets between the structure of the debris container and the door. One of the mounting brackets includes slots that define a lost-motion function that allows the powered actuator to open and close the door while also allowing an operator to manually open and close the door and allowing the door to open under the influence of gravity when the container is in its "elevated and dump" position.

10 Claims, 6 Drawing Sheets

DUMP DOOR OPEN/CLOSE SYSTEM

CROSS-REFERENCE TO RELATED APPLICATION

This application claims the benefit of U.S. Provisional Patent Application 60/466,044 filed by the applicants herein on Apr. 29, 2003, the disclosure of which is incorporated herein by reference.

BACKGROUND OF THE INVENTION

The present invention relates to a system for opening and closing a debris door on the debris container of a roadway or pavement sweeping vehicle and, more particularly, to a system for opening and closing the debris container by use of a powered actuator, manually by a vehicle operator, and under the influence of gravity when the debris container is in its elevated "dump" position.

Various types of pavement and roadway sweeping vehicles are known. Typically, these machines include some type of debris-collection container that is part of an air-flow recirculation circuit into which debris-laden air is passed and from which the particulate debris is removed. The debris containers typically have an internal volume of 4–10 cubic yards and often include one or more access doors and/or panels by which the interior of the container may be inspected and from which debris may be removed or 'dumped'.

One type of debris container is designed to be lifted vertically upward from the vehicle and tilted to cause the debris door to open under the influence of gravity to discharge the debris from the container.

BRIEF SUMMARY OF THE INVENTION

It is an object of the present invention to provide a system for opening and closing the debris door of a debris container using an actuator which also allows an operator to manually open and close the door and also allows the door to open under the influence of gravity when the container is in its elevated and dump alignment.

A debris container of the type used on roadway and pavement sweepers and sweeping vehicles includes a hinged door through which the interior of the debris container may be inspected and through which debris is emptied when the container is elevated and rotated to its dump position. A powered actuator, which may be an electrically powered screw-rod assembly, is connected by mounting brackets between the structure of the debris container and the door. One of the mounting brackets includes slots that define a lost-motion function that allows the powered actuator to open and close the door while also allowing an operator to manually open and close the door and also allowing the door to open under the influence of gravity when the container is in its "elevated and dump" position.

Other objects and further scope of applicability of the present invention will become apparent from the detailed description to follow, taken in conjunction with the accompanying drawings, in which like parts are designated by like reference characters.

DESCRIPTION OF THE INVENTION

The present invention is designed for use with debris container of various types that have a door from which debris is removed or dumped from the container and through which the container may be inspected by an operator.

Figure 1:
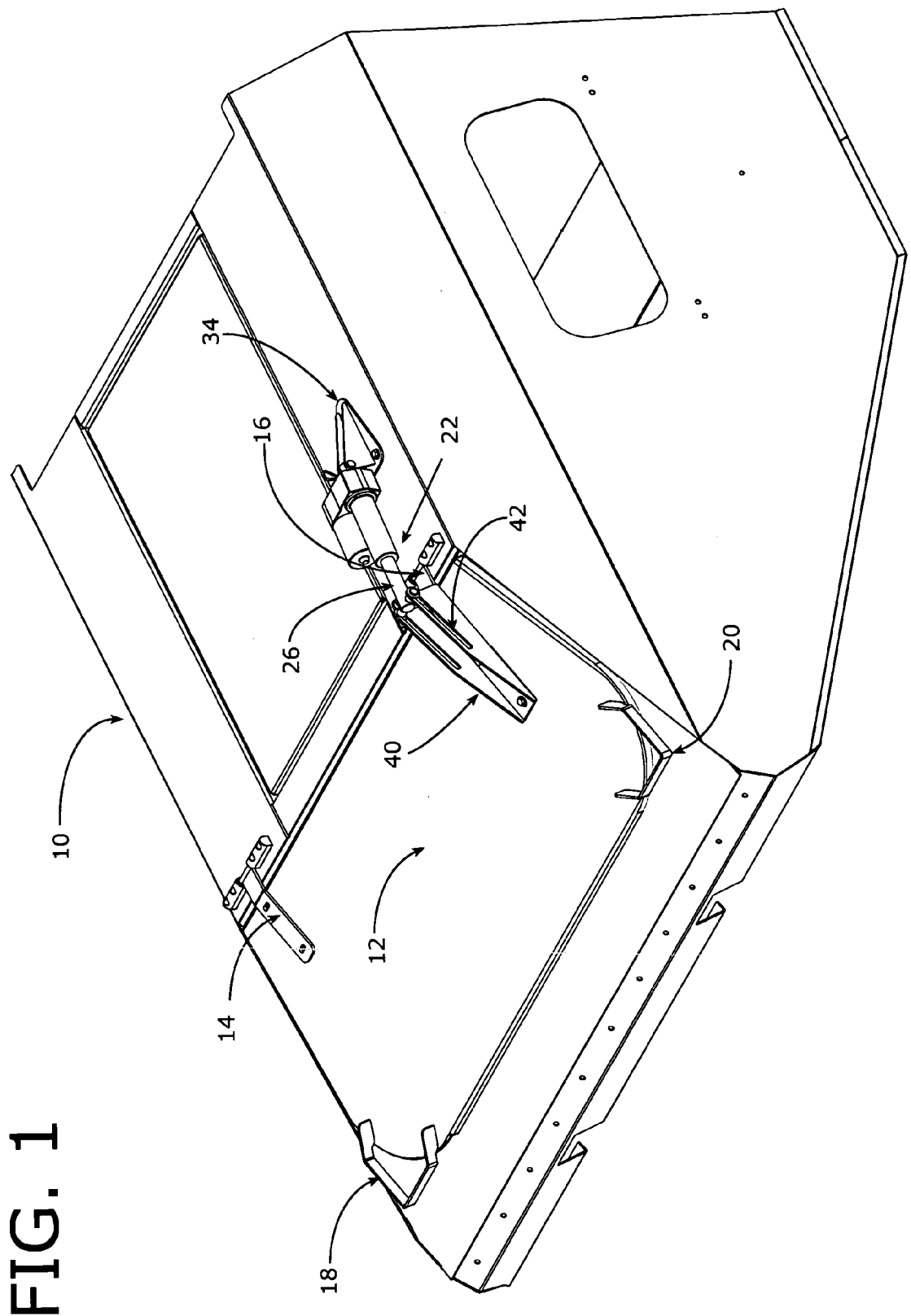
FIG. 1 is a perspective view of a representative debris container having a hinged door.
Figure 2:
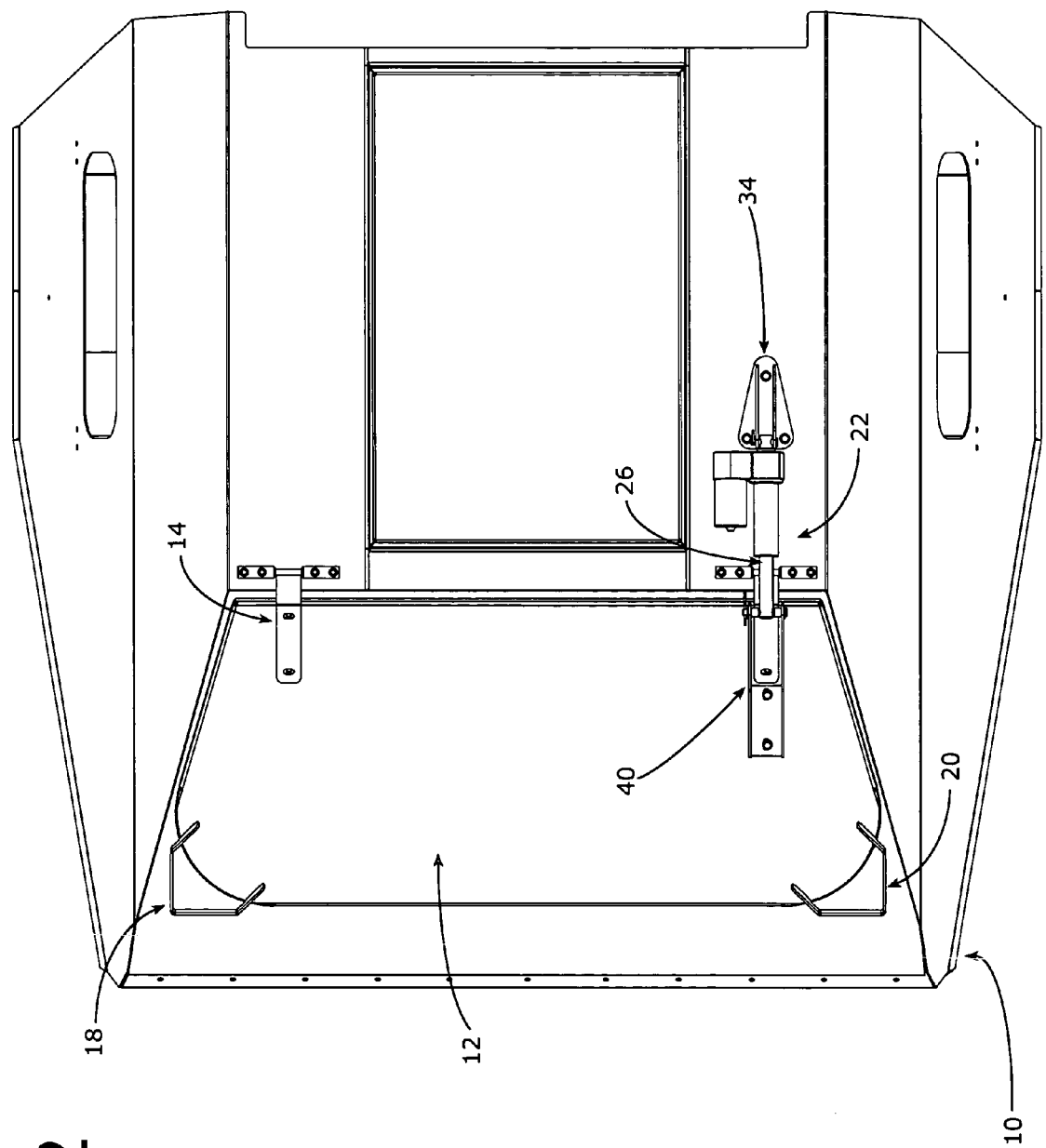
FIG. 2 is a top view of the debris container shown in FIG. 1.
Figure 5:
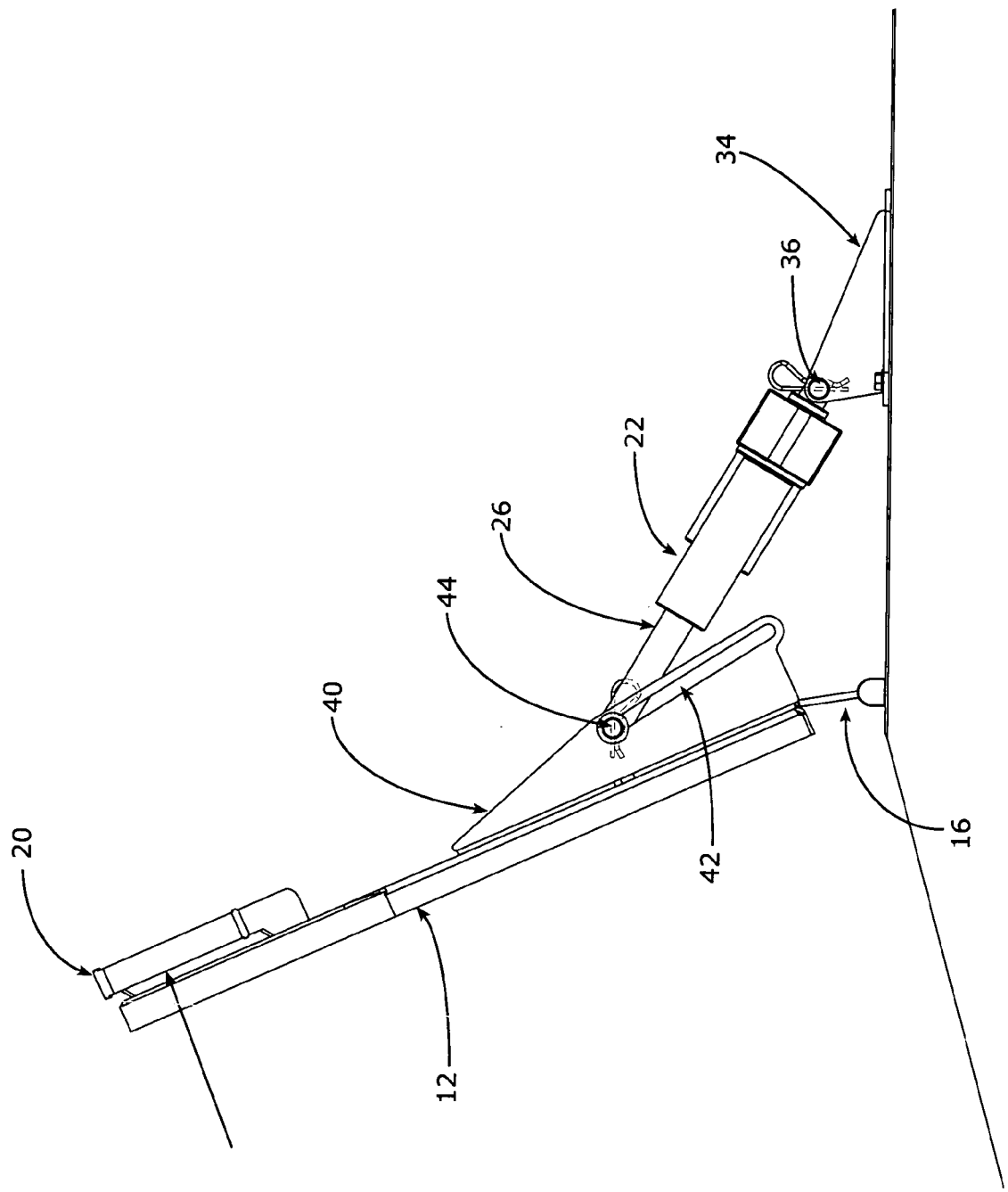
FIG. 5 is a side elevational view of the actuator of FIG. 3 in a manual door-open configuration.
Figure 6:
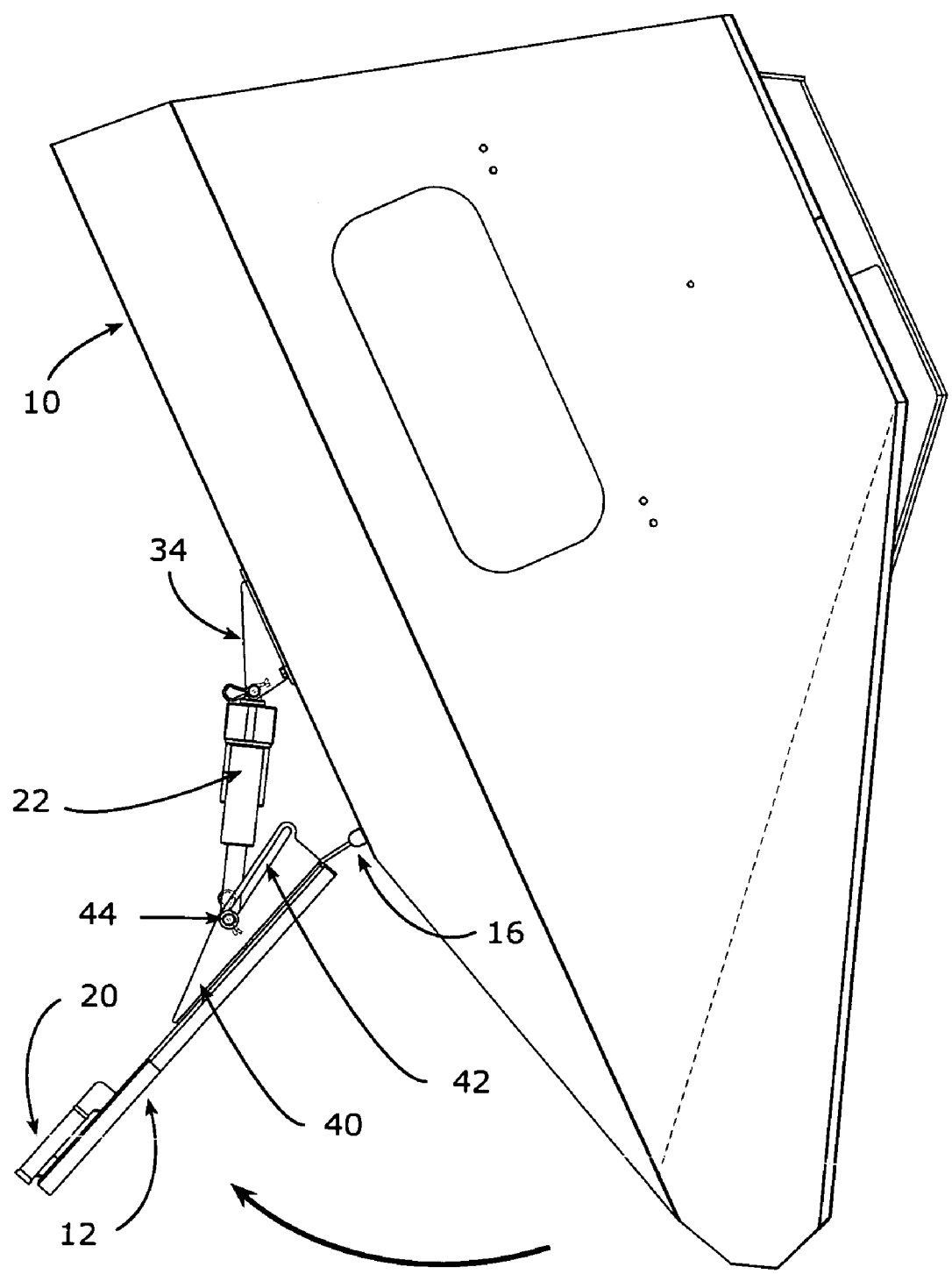
FIG. 6 illustrates an exemplary debris container in an elevated and tilted configuration by which the debris door opens under the influence of gravity to dump debris from the debris container.

A representative or exemplary debris container is shown in FIGS. 1, 2, and 6 and designated generally therein by the reference character 10. The debris container 10 includes a panel or door 12 located on a top surface thereof; as shown, the door 12 is connected by hinges 14 and 16 and includes lift handles 18 and 20. The door 12 can be moved to and from a closed position (best shown in FIGS. 1 and 2) to an open position (best shown in FIGS. 4, 5, and 6).

Figure 3:
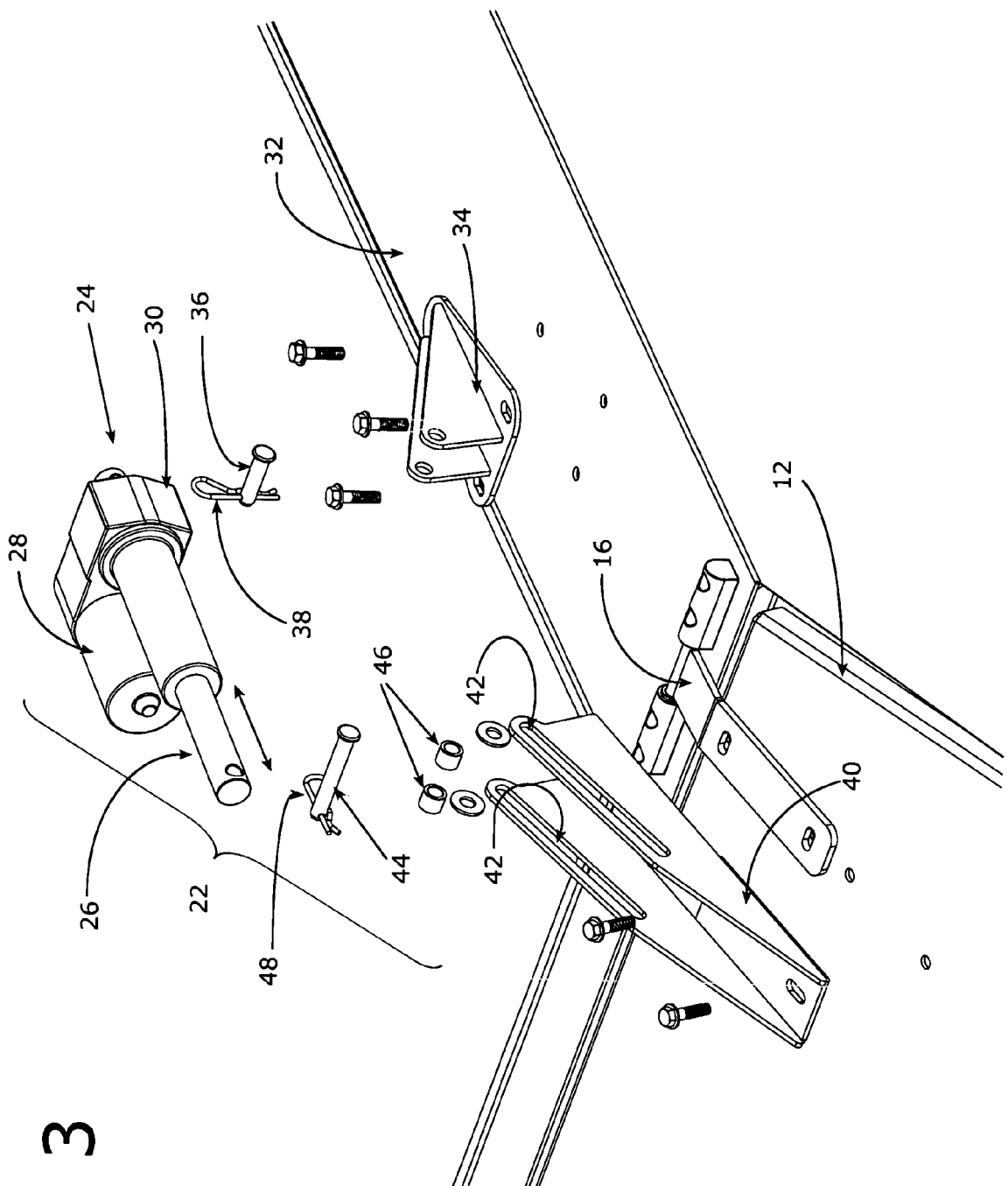
FIG. 3 is an detail from FIG. 1 showing an actuator and related components in exploded form.

An open/close actuator assembly, generally indicated at 22, is provided to open and close the door 12. As best shown in the exploded detail of FIG. 3, the actuator assembly 22 includes an actuator 24 having a ram or rod 26 designed to move bidirectionally in the directions shown. The actuator 24, in the preferred embodiment, is electrically powered and includes a motor 28 and a screw jack assembly 30 that moves or drives the rod 26 in one direction or the other. The electrical circuit and switches that control the actuator 24 are not shown in the figures. The actuator assembly 22 connected to an anchor bracket 34 that is secured to the top surface 32 of the container 10 by suitable threaded fastener (unnumbered). The connection between the actuator assembly 22 and the bracket 34 can be made using a clevis pin 36 and pin retainer 38, for example. The rod-end of the actuator assembly 22 is connected to the hinged door 12 through a lost-motion bracket 40 that is connected to the door 12 by threaded fasteners (unnumbered). The bracket 40 includes two spaced-parallel upstanding flanges (unnumbered), each of which includes an elongated slot 42. The distal end the rod 26 (which includes a throughbore) is connected to the bracket 40 by a clevis pin 44 that passes through each slot 42, the throughbore in the end of the rod 26, and a pair of bushings 46 and flat-washers (unnumbered). A pin-retainer 48 holds the clevis pin 44 in position. The ends of the slots 42 closest to the actuator assembly 22 constitute a first force transmitting limit and the ends of the slots furthest from the actuator assembly 22 constitute a second force transmitting limit.

Figure 4:
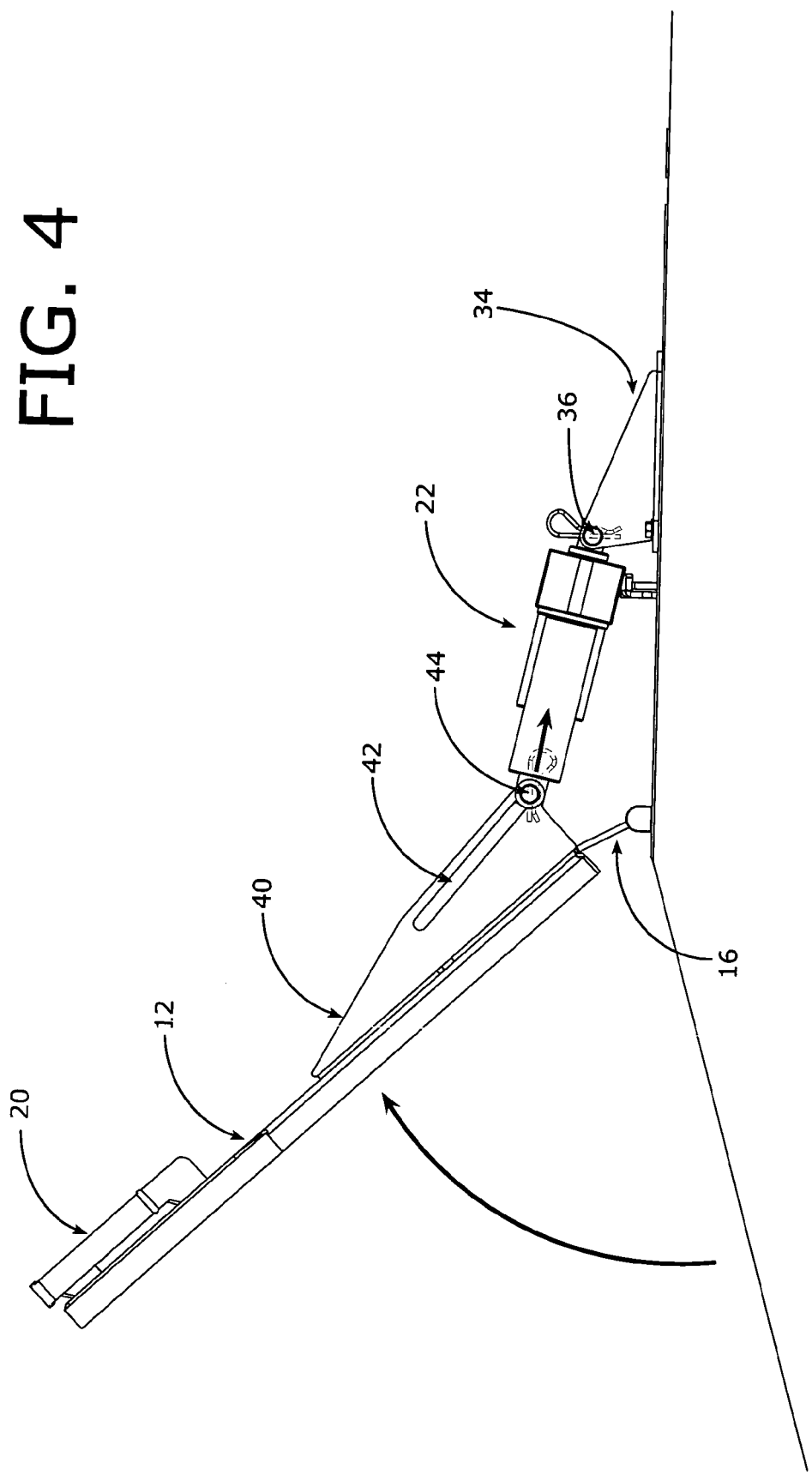
FIG. 4 is a side elevational view of the actuator of FIG. 3 in a door-open configuration.

As can be appreciated, when the rod 26 is retracted, the clevis pin 44 will "bottom" against the end of the slots 42 closest to the anchor bracket 34 (i.e., the first force-transmitting limit) as shown in FIGS. 1 and 2. Further retraction of the rod 26 will to cause the door 12 to rotate about its hinges 14 and 16 and thereby open, as shown in FIG. 4. Conversely, when the rod 26 is extended, the clevis pin 44 will "bottom" against the end of the slots 42 furthest from the anchor bracket 34 (i.e., the second force-transmitting limit) force the door 12 to its closed position.

When the clevis pin 44 is at a position intermediate or between the opposite ends of the slots 42, the "lost-motion" slots 42 in the bracket 40 allows the door 12 to be manually opened by an operator and/or opened under the influence of gravity when the container 10 is in its elevated "dump" position (as shown in FIG. 6).

More specifically and as shown in FIG. 5, when the door 12 is in its closed position, an operator can use the handles 18 and 20 to manually raise and thereby open the door 12. The clevis pin 44 will move in its slots 42 to accommodate the opening of the door 12. In addition and as shown in FIG. 6 (where the debris container 10 is shown in its elevated and rotated "dump" position), the door 12 will open in response to the influence of gravity, the clevis pin 44 again moving in its slots 42 to accommodate the opening of the door 12 to allow the contents of the debris container 10 to be dumped therefrom. When it is desired to close the door, the actuator 22 is operated to cause its operating rod 26 to extend and the clevis pin 44 to push against the end of the slots 42 remote from the actuator 22 (i.e., the second force transmitting limit) to force the close toward and to its closed position.

While the disclosed embodiment has been shown with an electrical actuator driving a screw-jack, as can be appreciated, other types of actuators, including hydraulic and pneumatic cylinders, are likewise suitable. Additionally, the position of the bracket and the anchor can be reversed, that is, the bracket that includes the lost motion slots can be attached to the top of the debris container rather than the door.

While the present invention has been described and shown in the context of a dump door for a debris-container, as can be appreciated, the system can be used on other contexts.

The disclosed invention advantageously addresses the problem of using a powered actuator to open and close the door of a debris container while accommodating the manual opening of the door and the opening of the door when the debris container is in its elevated and dump position.

As will be apparent to those skilled in the art, various changes and modifications may be made to the illustrated embodiment of the present invention without departing from the spirit and scope of the invention as determined in the appended claims and their legal equivalent.

The invention claimed is:

1. A door open/close system, comprising:
   a door mounted for movement between an open and a close position,
   an actuator mechanism connected between an anchor point and the door for actuating the door between the open and close positions; said actuator mechanism having an operating rod selectively moveable between a retracted and an extended position;
   a lost-motion structure having a first force transmitting limit and second force transmitting limit, an end of the rod connected to the lost-motion structure such that the rod, when retracted against the first force transmitting limit, opens the door in response to the retraction of the rod and, when extended against the second force transmitting limit, closes the door, the end of the rod movable between said first and second force transmitting limits without causing door movement.

2. The door open/close system of claim 1, wherein said actuator mechanism comprises an electrically driven screw actuator.

3. The door open/close system of claim 1, wherein said lost-motion structure comprises a structure connected to the door having an elongated slot therein, opposite ends of said slot constituting said first and second force transmitting limits.

4. The door open/close system of claim 1, wherein said lost-motion structure comprises a bracket connected to the door having an elongated slot therein, opposite ends of said slot constituting said first and second force transmitting limits and a pin carried in said slot and connected to the end of said rod.

5. The door open/close system of claim 1, wherein said lost-motion structure comprises a bracket connected to the door having first and second elongated slots therein, opposite respective ends of said slots constituting said first and second force transmitting limits and a pin carried in said slots and connected to the end of said rod.

6. A door open/close system, comprising:
   a door mounted for movement between an open and a close position,
   an actuator mechanism connected between an anchor point and the door for actuating the door between the open and close positions; said actuator mechanism having an operating member selectively moveable between a retracted and an extended position;
   a lost-motion structure having a first force transmitting limit and second force transmitting limit, an end of the member connected to the lost-motion structure such that the member, when retracted against the first force transmitting limit, opens the door in response to the retraction of the member and, when extended against the second force transmitting limit, closes the door, the end of the member movable between said first and second force transmitting limits without causing door movement.

7. The door open/close system of claim 6, wherein said actuator mechanism comprises an electrically driven screw actuator.

8. The door open/close system of claim 6, wherein said lost-motion structure comprises a structure connected to the door having an elongated slot therein, opposite ends of said slot constituting said first and second force transmitting limits.

9. The door open/close system of claim 6, wherein said lost-motion structure comprises a bracket connected to the door having an elongated slot therein, opposite ends of said slot constituting said first and second force transmitting limits and a pin carried in said slot and connected to the end of said member.

10. The door open/close system of claim 6, wherein said lost-motion structure comprises a bracket connected to the door having first and second elongated slots therein, opposite respective ends of said slots constituting said first and second force transmitting limits and a pin carried in said slots and connected to the end of said member.

* * * * *